CIRCUIT FOR DETECTING THE PRESENCE OF A SPECIAL CHARACTER IN PHASE-ENCODED BINARY DATA

Filed Dec. 28, 1965

INVENTOR
WILLIAM T. HARNETT

BY Owen L. Lamb

AGENT 3,418,585

CIRCUIT FOR DETECTING THE PRESENCE OF A SPECIAL CHARACTER IN PHASE-ENCODED BINARY DATA

William T. Harnett, Pleasant Valley, N.Y., assignor to International Business Machines Corporation, Armonk, N.Y., a corporation of New York

Filed Dec. 28, 1965, Ser. No. 517,020
4 Claims. (Cl. 328—134)

ABSTRACT OF THE DISCLOSURE

A detection circuit for distinguishing a special character from valid data in a phase-encoded data recording system. The special character is recorded by omitting a regularly occurring data shaft at mid-bit period. The detection circuit detects the absence of a data signal shift at mid-bit period.

This invention relates to phase encoding, and more particularly to means for reading a special character in a phase encoded storage system.

U.S. Patent Number 3,382,492, Magnetic Data Record Formatting, by George R. Santana, filed July 27, 1965, which issued May 7, 1968, discloses a means for recording special characters inself-clocking codes. Self-clocking codes include double frequency and phase modulation, wherein a signal polarity reversal occurs regularly at the begining of each clock interval and an additional reversal may occur at the mid-point of an interval depending upon the binary value of the signal recording in that clock interval. The abovementioned patent utilizes the fact that the absence of the regularly recurring reversal constitutes an invalid condition which cannot possibly occur in correctly recorded data. Accordingly, the omission of the first reversal in a clock interval, or a sequence of intervals, can be used to identify format information without the possibility of confusion with valid data. The abovementioned patent, provides apparatus for detecting a missing clock bit in a double-frequency recording system. However, no means are provided for detecting a missing clock bit in a phase encoded system.

It is therefore an object of the present invention to provide means for distinguishing a special character from a valid data representation in a phase encoded recording system.

The above object is accomplished in accordance with the invention by providing a half-period detector which produces two pulses within every data period on one signal line whenever a binary one is present and on another signal line whenever a binary zero is present. Whenever a special character is recorded in the system, the half-period detector only generates a single pulse during a data period on the one signal line and a single pulse on the zero signal line. Valid data is detected by detecting the sequence of two pulses during a bit period appearing on the one or zero data line. A special character is detected by detecting a single pulse occurring on either the one or the zero line followed by a single pulse occurring on the opposite signal line during the same bit period. The invention provides means for sensing the valid sequence in a normal bit period and for gating out a pulse when the abnormal sequence is detected.

The foregoing and other objects, features and advantages of the invention will be apparent from the following particular description of a preferred embodiment of the invention, as illustrated in the accompanying drawing.

Phase encoding recording is self clocking, that is, there is at least one signal polarity reversal per clock interval. In this specification, a one bit of data is represented by a change from a positive signal polarity to a negative polarity and a zero binary bit of data is represented by a change from a negative polarity to positive polarity.

Figure 1:
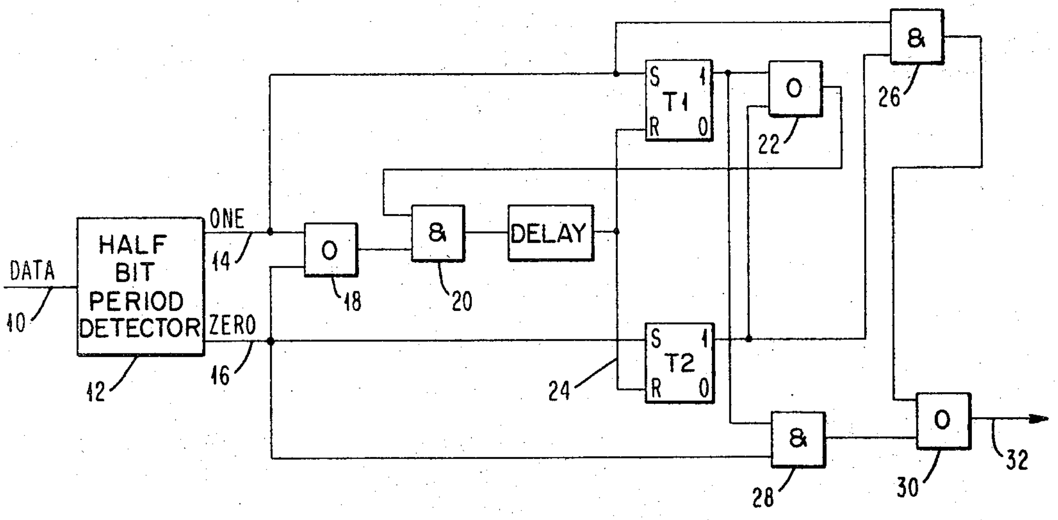
FIG. 1 is a block schematic diagram of logical circuitry in which the invention is embodied.
Figures 2, 3:
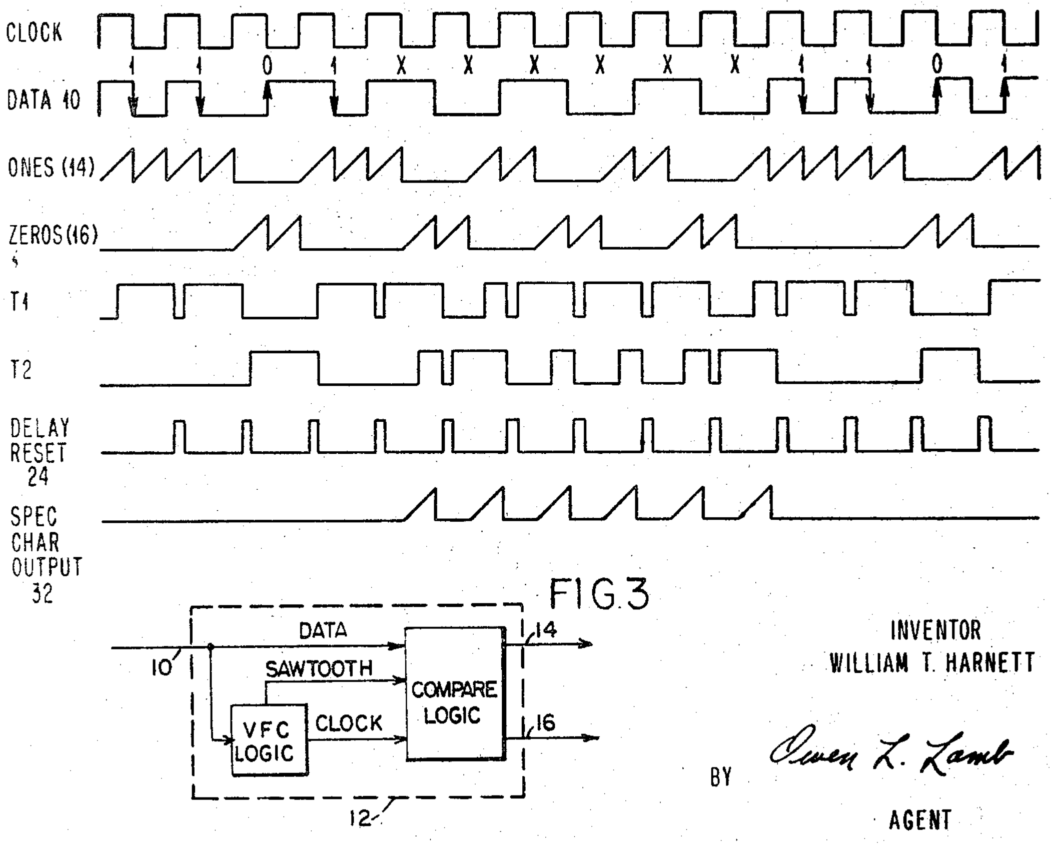
FIG. 2 is a timing diagram illustrating the voltage at various points within the circuitry of FIG. 1.
FIG. 3 is a block schematic diagram of the half-bit period detector of FIG. 1.

Referring now to FIG. 1, data is applied to the circuitry over input line 10 and it takes the form shown in the wave form of FIG. 2. Data is applied to a half-bit period detector 12 (FIG. 3) which may include a variable frequency clock (VFC) detection system of the type shown in U.S. Patent 3,217,183 to Thompson et al., filed January 4, 1963. Whenever clock and data are in phase a sawtooth is generated on "one" line 14. Whenever clock and data are out of phase, a sawtooth is generated on "zero" line 16. The one output line 14 of the half-bit period detector is applied to the set input of a trigger T1 which turns on approximately at the midpoint of the sawtooth. The zero output line 16 of the half-bit detector 12 is applied to the set input of another trigger T2. T1 and T2 are turned off by a reset pulse generated by ORing the outputs 14 and 16 in an OR circuit 18 and ANDing the output of OR 18 with the condition that either T1 or T2 is on, supplied by the output of OR circuit 22. The output of AND circuit 20 is delayed by a delay circuit, the output 24 of which resets both triggers T1 and T2. This reset is delayed to occur in the next bit period before either of the lines 14 and 16 reaches the point at which triggers T1 and T2 will be again turned on.

The output of trigger T2 is applied to AND circuit 26, the other leg of which is energized by the one output 14 of half-bit period detector 12. The output of trigger T1 is applied to AND 28, the other leg of which is energized by the zero output 16 of half-bit period detector 12. The output of AND circuits 26 and 28 are ORed together in OR circuit 30. The output 32 of OR 30 indicates a special character has been sensed.

The operation of this circuit will be more clearly understood by referring to the timing diagram of FIG. 2. That timing diagram illustrates four bit periods containing a valid sequence of data bits, 1 1 0 1, followed by a string of 6 special characters. The half-bit period detector output 14 generates two sawtooth pulses in the first bit period and two sawtooth pulses in the second bit period corresponding to the first two data bits. The third data bit is a zero. Since clock and data are now out of phase, sawtooth pulses are generated on line 16 for as long as the out-of-phase condition persists. The next bit of data is a one, and since clock and data are again in phase, two sawtooth pulses are generated on output 14.

The fifth data bit period contains the first special character which is labeled X. The special character was written by inhibiting a signal reversal at the mid-point of the fifth data bit period. Therefore, clock and data are in phase for one-half bit period. One sawtooth occurs on the half-bit period detector output line 14 and one sawtooth occurs during this bit period on half-bit detector output 16. The next bit is also a special character which results in a sawtooth pulse on line 16 followed by a sawtooth pulse on line 14. Thus it can be seen that the sequence of sawtooth pulses for valid data is 1 1 or 0 0 during a bit period whereas for a special character the sequence is 1 0 or 0 1 occurring on the half-bit detector lines 14 and 16.

The valid data sequence is distinguished from a special character sequence by operation of the triggers T1 and T2. Trigger T1 is turned on by the first sawtooth voltage occurring on line 14. The output of Trigger T1 is then combined with the line 14 at AND 20. The output of AND 20 passes through a delay circuit causing a delayed reset output 24 to reset T1 in the next bit period. Thus, the first sawtooth in a bit period turns on T1 and the second sawtooth delayed turns off T1 in the next bit period. Trigger T2 operates in a similar manner being turned on by the first sawtooth of a zero bit and being turned off by the second sawtooth delayed into the next bit period. When a special character is sensed, for example in the fifth bit period of FIG. 2, trigger T1 is turned on in the first half of the bit period, and trigger T2 is turned on in the last half bit period. Trigger T1 output energizes AND circuit 28, thus allowing a zero sawtooth pulse occurring on line 16 in the second half of the cycle to be gated through the AND circuit 28 and the OR circuit 30 on to the output line 32. Triggers T1 and T2 are reset by the delayed reset pulse 24 caused by T1 being on and a zero occurring on line 16 in the second half of the cycle. Six special characters are recognized in the same manner. Means may be provided on the output 32 to count or otherwise sense a predetermined number of special characters before indication is given that a special character has been recognized. This will insure that spurious noise, phase shift, or temporary losses in synchronization will not cause a special character indication.

While the invention has been particularly shown and described with respect to one embodiment thereof, it will be understood by those skilled in the art that various changes in form and details may be made therein without departing from the spirit and scope of the invention.

What is claimed is:

1. In a phase encoded data detection system in which data is compared with a clock signal and a pulse is generated on a first line within a one-half data bit period when the data and clock signal are in phase and in which a pulse is generated on a second line within every one-half data bit period when the data and clock signal are out of phase, means for detecting the absence of a data signal shift at mid-period comprising:

a storage device, means for energizing said storage device in response to a pulse occurring in the first half of a bit period on the first signal line, and means energized by said storage device and the second signal line for generating an output pulse upon the condition that said storage device is energized and the condition that a pulse occurs on said second signal line during the second half of the bit period.

2. The combination according to claim 3 including means for de-energizing said storage device in response to a pulse occurring in the second half of a bit period on either the first or second signal line.

3. In a phase encoded data detection system in which data is compared with a clock signal and a pulse is generated on a first line every one-half bit signal period when said data and clock signals are in phase and a pulse is generated on a second line every one-half bit period when said data and clock pulses are out of phase, apparatus for detecting the absence of a data shift at mid-bit period comprising:

a first binary bit storage means having means for setting and resetting said storage means, a second binary bit storage means having means for setting and resetting said storage means, means for setting said first storage means in response to a pulse occurring on said first signal line, means for setting said second bit storage means in response to a pulse occurring on said second signal line, means for resetting said first and second signal storage means upon the condition that either one of said storage means has a bit stored therein and a signal occurs on either one of said first and second signal lines, and means for producing a special character output pulse upon the condition that said first storage means is on and a signal occurs on said second signal line.

4. The combination according to claim 3 including the means for additionally generating a special character output pulse upon the condition that said second bit storage means is on and a pulse occurs on said first signal line.

References Cited

UNITED STATES PATENTS

| | | | |
|---|---|---|---|
| 3,191,013 | 6/1965 | Reader | 328—109 XR |
| 3,217,183 | 11/1965 | Thompson et al. | 328—110 XR |
| 3,283,255 | 11/1966 | Cogar | 328—99 |

ARTHUR GAUSS, *Primary Examiner.*

S. D. MILLER, *Assistant Examiner.*

U.S. Cl. X.R.

307—232, 218, 228; 328—109, 119; 340—174.1

UNITED STATES PATENT OFFICE
CERTIFICATE OF CORRECTION atent No. 3,418,585 December 24, 1968

William T. Harnett

It is certified that error appears in the above identified patent and that said Letters Patent are hereby corrected as shown below:

Column 1, line 16, "shaft" should read -- shift --; line 27, "inself" hould read -- in self --. Column 4, line 3, the claim reference numeral 3" should read -- 1 --.

Signed and sealed this 17th day of March 1970.

ŞEAL)
.ttest:

dward M. Fletcher, Jr.
.ttesting Officer

WILLIAM E. SCHUYLER, JR.
Commissioner of Patents